UNITED STATES PATENT OFFICE.

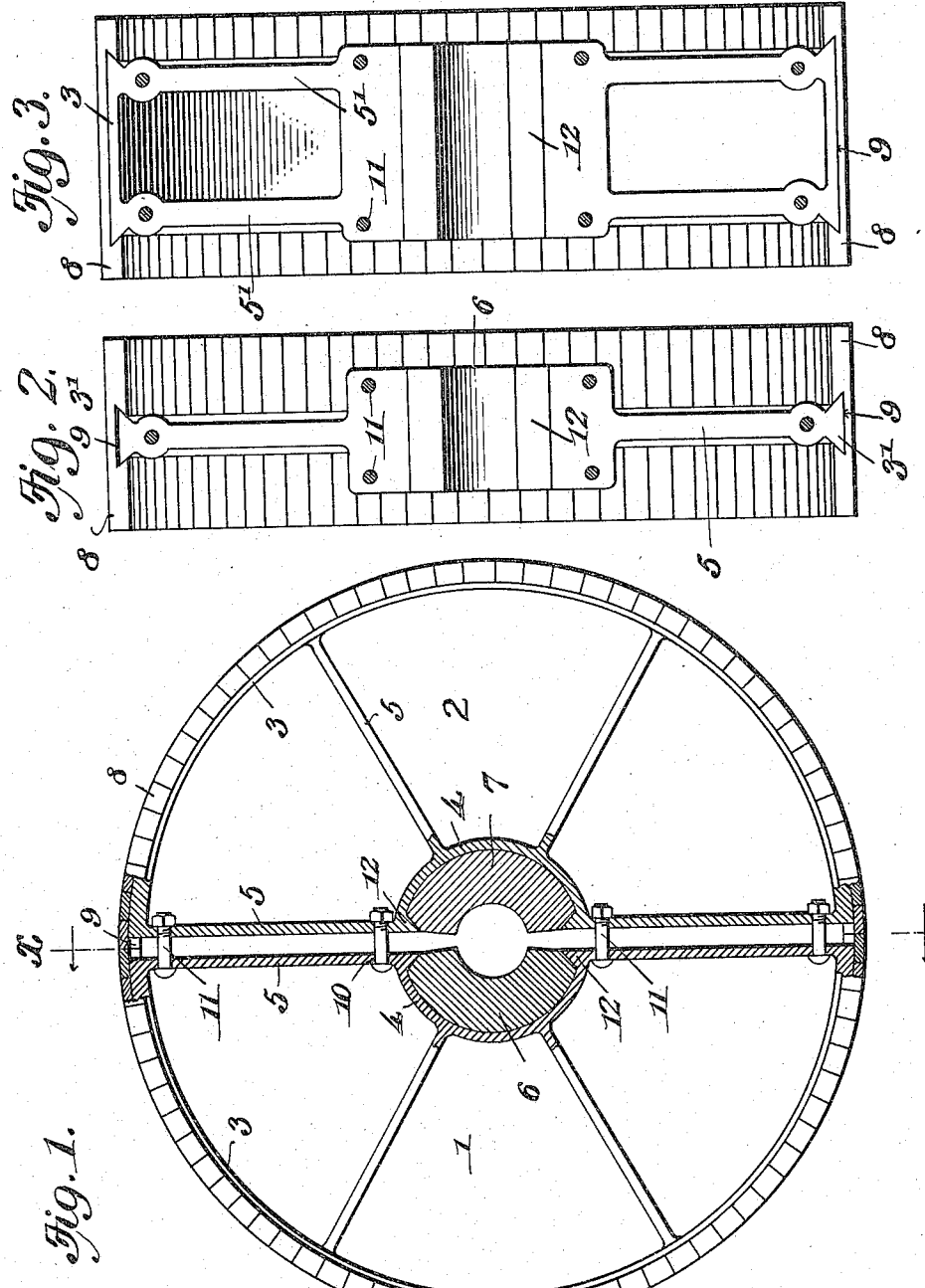

GUSTAVE FUENFSTUECK, DECEASED, LATE OF DENVER, COLORADO, BY IDA FUENFSTUECK, ADMINISTRATRIX, OF DENVER, COLORADO, ASSIGNOR OF ONE-HALF TO MAX WAESSEL, OF DENVER, COLORADO.

PULLEY.

1,148,507.　　　　Specification of Letters Patent.　　Patented Aug. 3, 1915.

Application filed August 27, 1913. Serial No. 786,893.

*To all whom it may concern:*

Be it known that GUSTAVE FUENFSTUECK, deceased, late a subject of the Emperor of Germany and late a resident of Denver, county of Denver, and State of Colorado, invented certain new and useful Improvements in Pulleys, of which the following is a specification.

This invention relates to pulleys, and more particularly to that class known as split pulleys.

The primary object of the invention is to provide a pulley which may be easily attached to or detached from a shaft, and which, when properly positioned upon or adjusted to a shaft, will be prevented from slipping or twisting thereon.

A further object of this invention is to provide a pulley of the character mentioned upon which the belt may be strung in the usual manner with the least possibility of the belt slipping upon the pulley or becoming disengaged therefrom.

A still further object of this invention is to provide a pulley presenting a wooden circumferential face, which is so arranged as to compensate for any irregularities therein caused by warping and shrinking.

A still further object of this invention is to provide a pulley with a wooden circumferential face, which presents a uniform tractive face to a belt, and which possesses all the advantages common to the ordinary wooden pulley and yet which has none of the disadvantages.

A still further object of this invention is to provide a pulley of the two piece type, as briefly referred to above, which is of light weight, extremely simple in construction, easily adjustable, and which is cheap in manufacture.

With these objects in view together with others which will appear as the description proceeds, the invention consists in a pair of identically formed pulley sections, which, when properly assembled, coöperate in forming a wheel, each of which comprises a semi-circular rim, spokes and a hub section, and a plurality of members adapted to be held in position upon the rims of said wheel sections to form a smooth periphery for the pulley, and means for holding the said sections in assembled position.

The invention further consists in a pair of wheel halves as mentioned, the rims and spokes being formed of metal and adapted to coöperate to form a pulley, a plurality of wooden members arranged upon the rim of said wheel sections in such manner as to present a smooth, yet tractive surface to the belt, and means whereby when the wheel halves or sections are secured together, the said wooden rim members will be held against displacement.

The invention further consists in a device characterized as above, the arrangement of wooden rim members with the grain therein transversely of the wheel rim to present a uniform gripping surface for a belt, and means upon the wheel sections for holding said sections and said rim members in assembled position.

The invention further consists in the novel arrangement and combination of parts all as will be fully described hereinafter and particularly pointed out in the claims.

The invention will be more readily understood with reference to the accompanying drawings, in which:

Figure 1 is a side elevation of a pulley constructed in accordance with the invention, parts of which being shown in section, Fig. 2 is a sectional view taken substantially upon the line $x$—$x$ of Fig. 1, and Fig. 3 is a view similar to Fig. 2, and illustrating a slightly modified form of the invention.

Referring now more particularly to the drawings, 1 and 2 represent generally the sections which go to make up the improved pulley, each section being provided with the arcuate rim portions 3, hub portions 4, and the usual spokes 5. It will be understood that the arcuate rim portions and hub portions of the two sections will be of equal dimensions, so that when assembled properly they present together a perfectly shaped wheel. In order that the wheel may be firmly secured against turning or slipping upon the shaft to which it is to be applied, a wooden core or bushing is provided, and this bushing consists of the coöperating members 6 and 7, which are adapted to be positioned within the respective hub portions 4 of the wheel sections. The rim portion of the sections is preferably dove-tailed in cross section, as clearly indicated at 3', in Fig. 2 of the drawings, the purpose of which arrangement will be more fully described later. In order that the wooden rim feature may be utilized in the present invention, a plurality of comparatively small blocks 8 are provided, each block being provided at its medial portion with a transversely disposed dove-tailed slot 9 of substantially the same dimension as the metallic rim of the wheel section. These blocks are adapted to be arranged upon the dove-tailed metallic rim above described, and preferably so that the grain of the wooden blocks extends transversely of the wheel rim, or parallel to the supporting shaft.

The adjacent spokes of the coöperating wheel section are provided with alined openings 10 at different points throughout their length for the reception of securing bolts 11. It should be noted that the blocks 8 are slidably mounted on the dove-tailed rim 3', and that the end blocks on each wheel section extend slightly beyond the rim ends thereof to engage or abut the adjacent faces of the end blocks on the opposite wheel section, the purpose of this arrangement being to cause the blocks upon the periphery of the wheel sections to be tightly held in position when the several sections of the wheel are assembled, which obviously reduces the shrinkage, breakage or warping, common to most wooden pulleys to a minimum, and the arrangement also provides means whereby the tightening of the bolts 11 will compensate or take up the shrinkage of the blocks should such shrinkage occur after the device is assembled.

The hub portions 4 of the sections are provided at different points in the circumference, preferably at their outer edges, with inwardly projecting flanges 12, designed for the purpose of retaining the bushing members 6 and 7 in correct position, and preventing the same from rotating with relation thereto.

From the foregoing description it will be seen that a wheel so constructed may be quickly and easily assembled, and secured to the shaft, the single operation of tightening the nuts upon the bolts 11 being sufficient to hold the separate sections securely together, to retain the wooden block members firmly in position upon the periphery of the metallic rim, to take up shrinkage of the blocks, and to rigidly secure the assembled wheel against rotation upon the shaft. It will also be obvious that a wheel so constructed possesses all the advantages common to the wooden pulley and to the metallic pulley, and yet which is so arranged as to dispense with the disadvantages incident to both of the above mentioned forms of pulleys; that is, it possesses the strength of the metallic pulley in the metallic rim, spokes and hub portion of each section, while it possesses the advantages of the wooden pulley by the arrangement of the wooden blocks upon the rim to form a wooden tractive face for the wheel. Furthermore, by this construction the blocks may be formed so that throughout the entire operative face of the pulley an edge grain is presented to the belt, thereby presenting a uniform tractive power throughout its circumference. The arrangement of the wooden blocks with the grain therein running transversely of the rim, obviously presents to the belt a uniform gripping surface, and thereby eliminates the unsteady movement transmitted to the belt, or from the belt, which ever the case may be, common to the ordinarily constructed wooden pulleys. It will also be noted that the wooden blocks comprising the rim of the pulley are rigidly held in position upon the metallic rims without the aid of screws or bolts, thereby retaining the original strength in the blocks, and also rendering the same easily removable in case any of the blocks become broken, uneven or warped.

In Fig. 3 of the drawings there is illustrated a slightly modified form of the invention, wherein the use of transversely disposed blocks common to the preferred form of the invention are applied to a pulley of greater dimensions. In constructing pulleys of wider treads in accordance with my invention, the same general principle is employed, the dove-tailed metallic rim being widened, as shown in Fig. 3, and the wooden blocks widened proportionately and provided with the dove-tailed slot to enable the same to be positioned upon the same metallic rim the same as in the form already described. In order that the larger pulleys may be constructed as lightly as is consistent with the strength necessary, the spokes connecting the rim and hub portion are arranged in pairs, one spoke at each end of the hub sections, as shown at 5'. In this manner the same ends are attained as in the preferred form of the device, as the same will be strong, efficient, equally as simple and easily of adjustment, and which is extremely light for a pulley adapted to bear the strain incident to machinery employing the heavier and stronger belts.

I claim:

1. In a sectional pulley or wheel, a plurality of arcuate hub sections, each of said hub sections being provided at their ends with an inwardly extending flange, a shaft engaging hub bushing arranged in each of said hub sections being held against circumferential movement therein by said flanges, the ends of each of said bushings being inclined outwardly beyond the plane of its respective hub section end and flange, and means for holding said sections together, substantially as described.

2. In a device of the class described, the combination with a pulley comprising a plurality of segmental sections each having a rim portion, spokes and a hub portion; of a plurality of blocks slidably mounted upon said rim portions, and a bushing section arranged within each of said hub portions, the blocks at each end of said rim portions extending slightly beyond the same and the said bushing sections extending slightly beyond the ends of said hub portions, whereby upon assembling said pulley sections the end blocks and bushing section of each of said wheel sections will abut the corresponding blocks and bushing section of the adjacent wheel section, and means for holding said pulley sections in assembled position, substantially as described.

In testimony whereof I have signed my name to this specification in the presence of two subscribing witnesses.

IDA FUENFSTUECK,
*Administratrix of estate of Gustave Fuenfstueck, deceased.*

Witnesses:
ERNEST O. PALMER,
J. R. MCDONALD.

Copies of this patent may be obtained for five cents each, by addressing the "Commissioner of Patents, Washington, D. C."